United States Patent
Ayers, Jr.

(10) Patent No.: US 6,691,645 B1
(45) Date of Patent: Feb. 17, 2004

(54) PET-ACCESSED LIGHTED RAMP ASSEMBLY

(76) Inventor: Earl M. Ayers, Jr., 4316 S. Coolidge Ave., Tampa, FL (US) 33611

( * ) Notice: Subject to any disclaimer, the term of this patent is extended or adjusted under 35 U.S.C. 154(b) by 0 days.

(21) Appl. No.: 10/449,894

(22) Filed: Jun. 2, 2003

(51) Int. Cl.[7] .......................... A01K 29/00; E01D 1/00; B65G 69/28
(52) U.S. Cl. ........................................ 119/847; 14/69.5
(58) Field of Search ................. 119/843, 847, 119/848, 849; 14/69.5

(56) References Cited

U.S. PATENT DOCUMENTS

| | | |
|---|---|---|
| 449,228 A | 3/1891 | Myers et al. |
| 1,235,125 A * | 7/1917 | Doyle .................... 119/847 |
| 1,854,673 A | 4/1932 | Rust |
| 4,972,540 A | 11/1990 | Phelps |
| 5,213,060 A | 5/1993 | Sloan et al. |
| 5,454,196 A * | 10/1995 | Gaines et al. ................. 14/69.5 |
| 5,634,440 A | 6/1997 | Mogck |
| D382,676 S | 8/1997 | Holbrook |
| D412,224 S | 7/1999 | Adler |
| 5,924,383 A | 7/1999 | Smith |
| 6,119,634 A | 9/2000 | Myrick |
| D440,717 S | 4/2001 | Fazio |
| 6,267,082 B1 | 7/2001 | Naragon et al. |
| 6,516,752 B2 * | 2/2003 | Batterton .................... 119/847 |
| 6,526,614 B2 * | 3/2003 | Anderson et al. ............. 14/69.5 |

* cited by examiner

*Primary Examiner*—Charles T. Jordan
*Assistant Examiner*—Elizabeth Shaw

(57) ABSTRACT

A pet-accessed lighted ramp assembly for making it easier for a pet to climb upon a piece of furniture such as a sofa or bed. The pet-accessed lighted ramp assembly includes a support base being movably disposed upon a ground; and also includes a ramp member being mounted upon the support base for a pet to gain access upon a piece of furniture; and further includes a landing being mounted upon the support base and being connected to the ramp member; and also includes a railing assembly being mounted upon the support base; and further includes a light-emitting assembly for providing light along the ramp member and the landing for a pet to see while moving up and down the ramp member.

8 Claims, 4 Drawing Sheets

PET-ACCESSED LIGHTED RAMP ASSEMBLY

BACKGROUND OF THE INVENTION

1. Field of the Invention

The present invention relates to lighted ramps for pets and more particularly pertains to a new pet-accessed lighted ramp assembly for making it easier for a pet to climb upon a piece of furniture such as a sofa or bed.

2. Description of the Prior Art

The use of lighted ramps for pets is known in the prior art. More specifically, lighted ramps for pets heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,213,060; 6,267,082; 6,119,634; 5,924,383; 5,634,440; and U.S. Pat. No. Des. 382,676; U.S. Pat. Nos. 3,159,141; 449,228; 1,854,673; 4,972,540; U.S. Pat. No. Des. 382,676; and U.S. Pat. No. Des. 440,717.

While these devices fulfill their respective, particular objectives and requirements, the aforementioned patents do not disclose a new pet-accessed lighted ramp assembly. The prior art includes ramps structures for loading and unloading herds of cattle from trucks.

SUMMARY OF THE INVENTION

The general purpose of the present invention, which will be described subsequently in greater detail, is to provide a new pet-accessed lighted ramp assembly which has many of the advantages of the lighted ramps for pet's mentioned heretofore and many novel features that result in a new pet-accessed lighted ramp assembly which is not anticipated, rendered obvious, suggested, or even implied by any of the prior art lighted ramps for pets, either alone or in any combination thereof. The present invention includes a support base being movably disposed upon a ground; and also includes a ramp member being mounted upon the support base for a pet to gain access upon a piece of furniture; and further includes a landing being mounted upon the support base and being connected to the ramp member; and also includes a railing assembly being mounted upon the support base; and further includes a light-emitting assembly for providing light along the ramp member and the landing for a pet to see while moving up and down the ramp member. None of the prior art includes the combination of the elements of the present invention.

There has thus been outlined, rather broadly, the more important features of the pet-accessed lighted ramp assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new pet-accessed lighted ramp assembly which has many of the advantages of the lighted ramps for pets mentioned heretofore and many novel features that result in a new pet-accessed lighted ramp assembly which is not anticipated, rendered obvious, suggested, or even implied by any of the prior art lighted ramps for pets, either alone or in any combination thereof.

Still another object of the present invention is to provide a new pet-accessed lighted ramp assembly for making it easier for a pet to climb upon a piece of furniture such as a sofa or bed.

Still yet another object of the present invention is to provide a new pet-accessed lighted ramp assembly that is easy and convenient to set up and move about a house.

Even still another object of the present invention is to provide a new pet-accessed lighted ramp assembly that allows for older pets to get up onto a coach or sofa without having to be lifted upon thereupon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
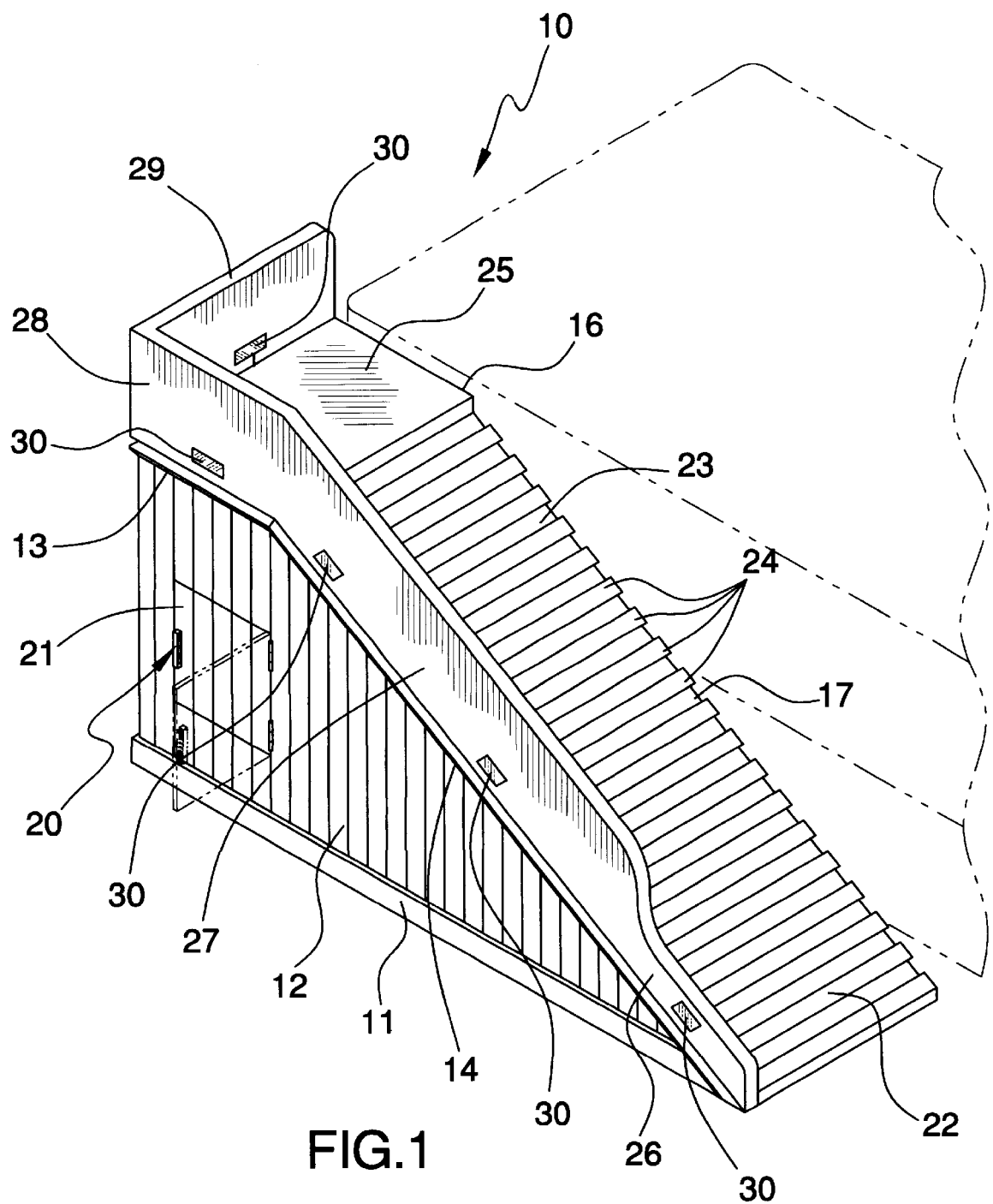
FIG. 1 is a perspective view of a new pet-accessed lighted ramp assembly according to the present invention.
Figure 2:
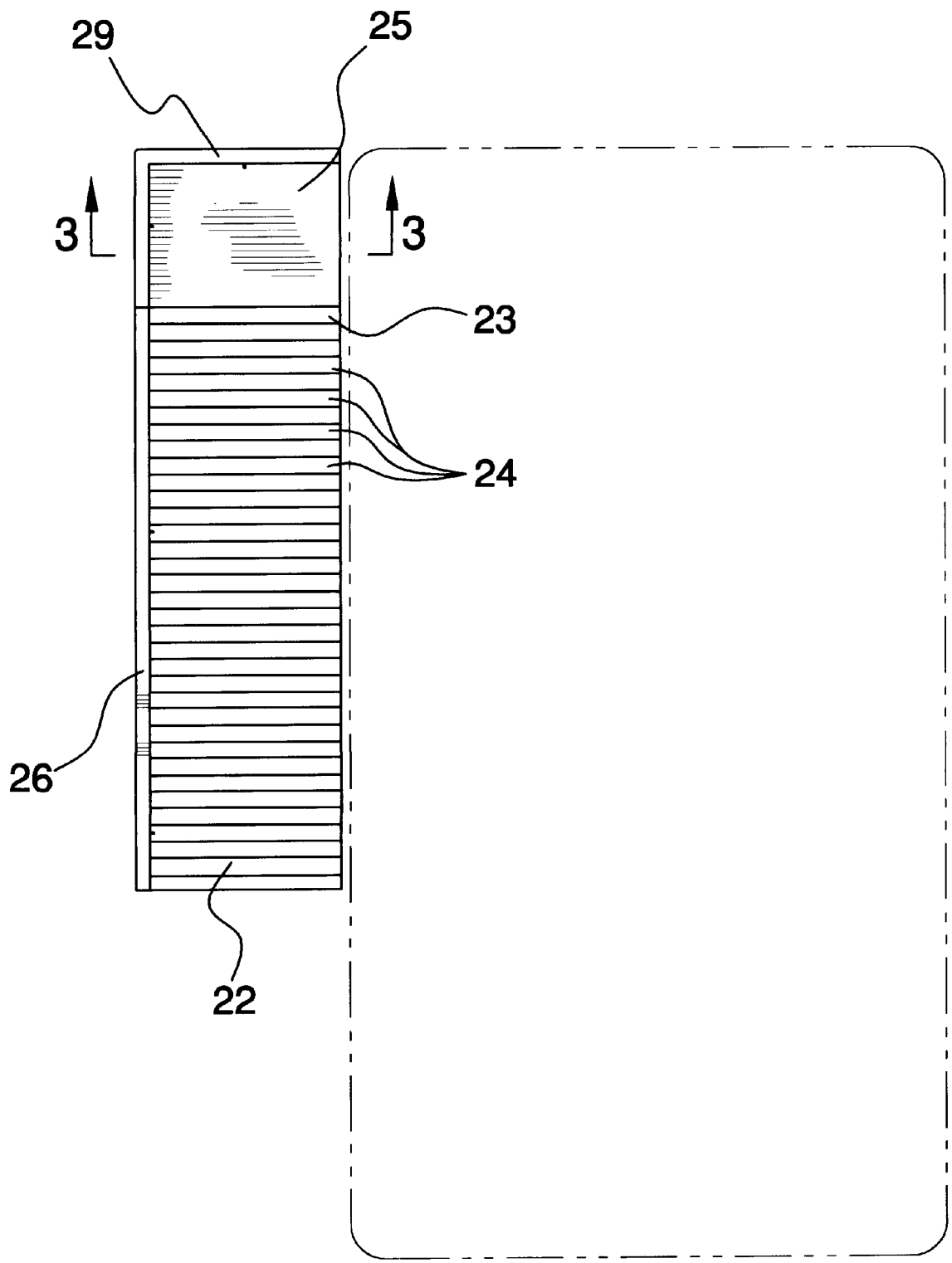
FIG. 2 is a top plan view of the present invention.
Figure 3:
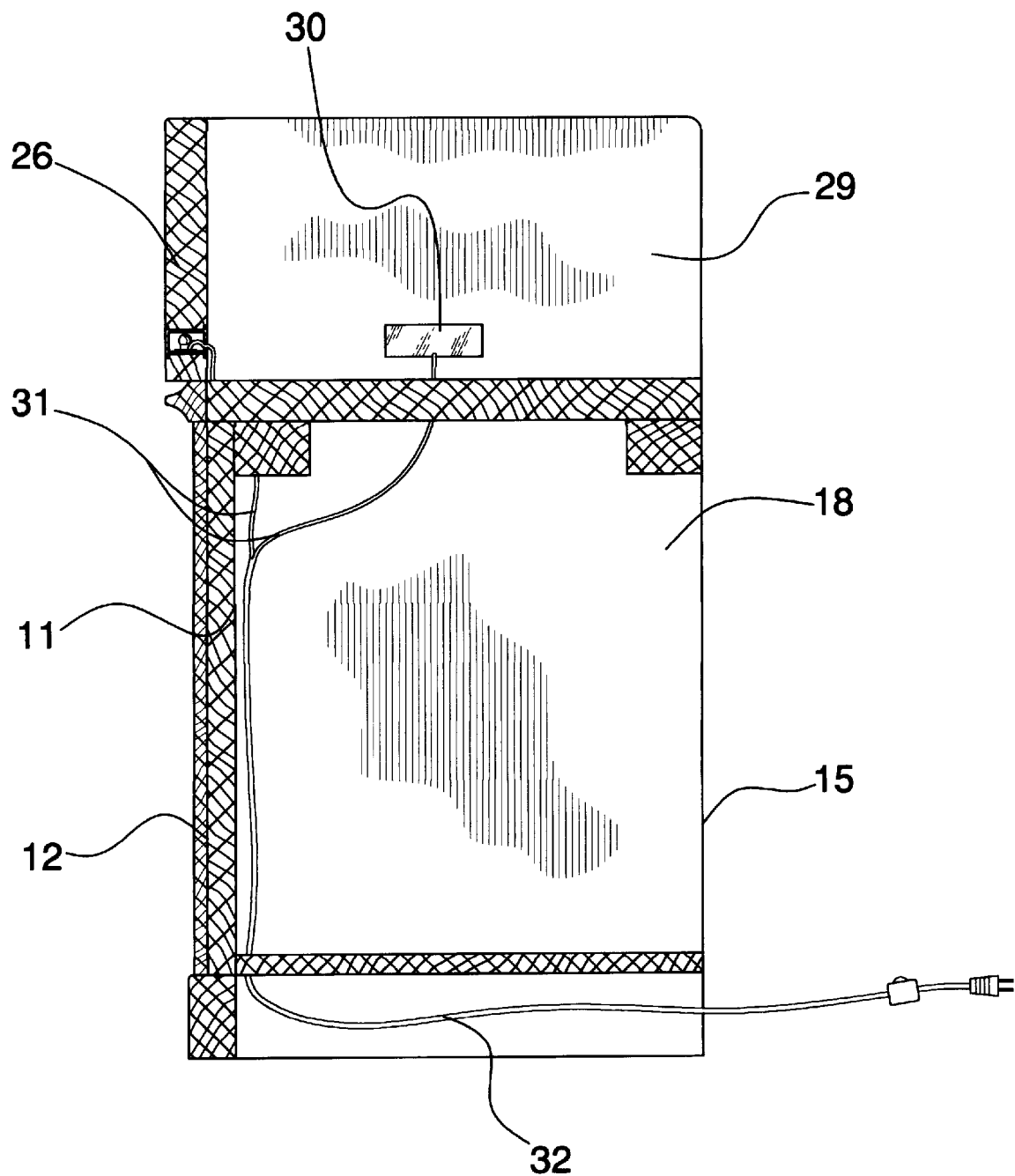
FIG. 3 is a lateral cross-sectional view of the present invention.
Figure 4:
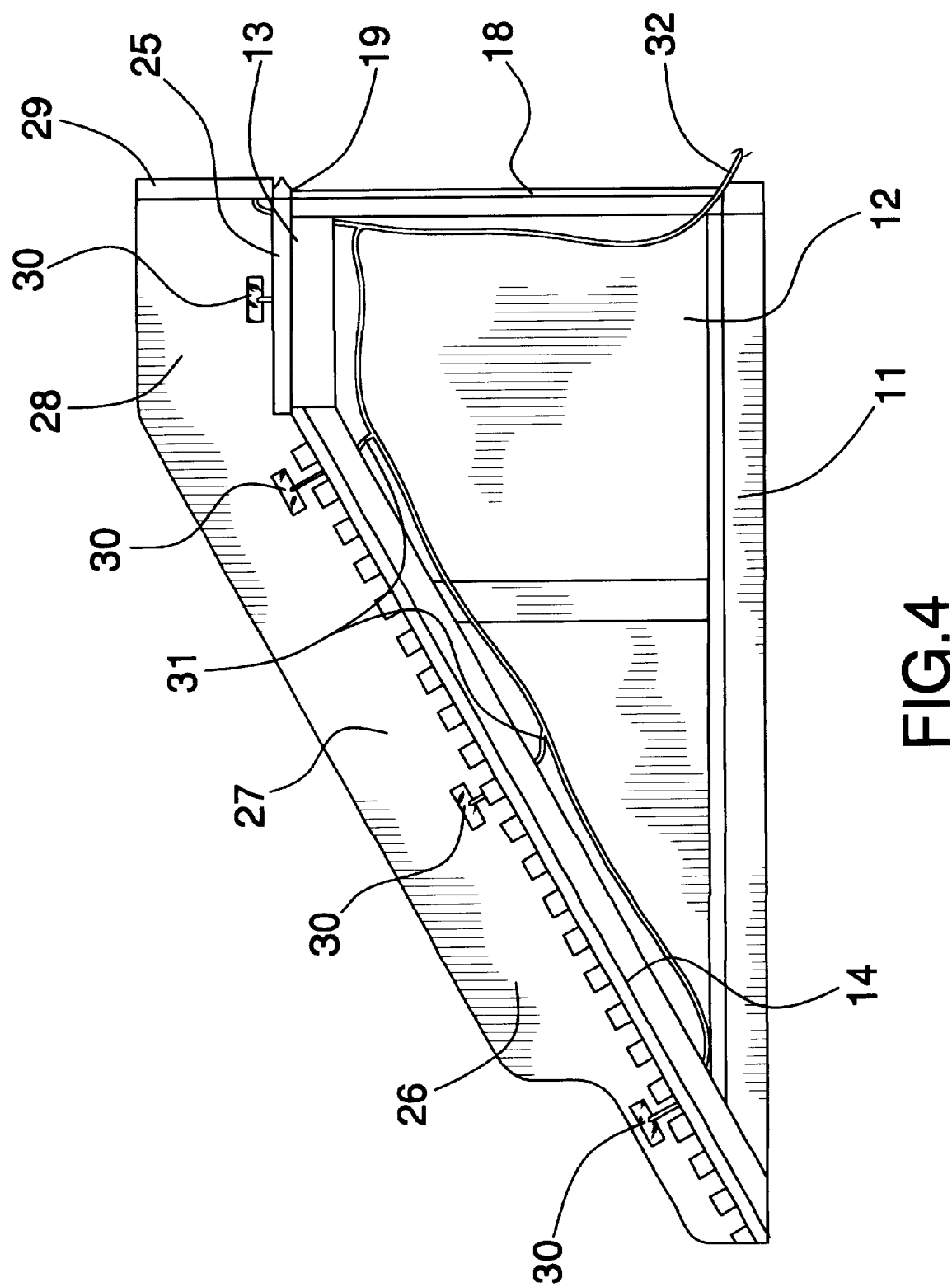
FIG. 4 is a longitudinal cross-sectional view of the present invention.

With reference now to the drawings, and in particular to FIGS. 1 through 4 thereof, a new pet-accessed lighted ramp assembly embodying the principles and concepts of the present invention and generally designated by the reference numeral 10 will be described.

As best illustrated in FIGS. 1 through 4, the pet-accessed lighted ramp assembly 10 generally comprises a support base 11 being movably disposed upon a ground. The support base 11 includes side walls 12,15 having top edges 13,14, 16,17 and also includes an end wall 18 having a top edge 19, and further includes a doorway 20 being disposed through one of the side walls 12, and also includes a door 21 being hingedly and conventionally attached to one of the side walls 12 and being closeable over the doorway 20. The top edges 13,14,16,17 of the side walls 12,15 include horizontal portions 13,16 being elevated above the ground, and also include slanted portions 14,17 extending from the horizontal portions 13,16 to the ground.

A ramp member 22 is securely and conventionally mounted upon the support base 11 for a pet to gain access to a piece of furniture. The ramp member 22 includes an elongate board member 23 being securely and conventionally mounted upon the slanted portions 14,17 of the side walls 12,15 and also includes slats 24 being securely and conventionally attached upon a top side of the elongate board member 23 and extending along a width of the elongate board member 23 and being laterally-spaced along a length of the elongate board member 23 to facilitate traction for the pet moving up and down the ramp member 22.

A landing 25 is securely and conventionally mounted upon the support base 11 and being conventionally connected to the ramp member 22. The landing 25 includes a platform being securely and conventionally mounted upon the horizontal portion 13,16 of the side walls 12,15 and upon the top edge 19 of the end wall 18 and being conventionally connected to a top end of the elongate board member 23.

A railing assembly is securely and conventionally mounted upon the support base 11. The railing assembly includes a first wall 26 being conventionally mounted upon the horizontal and slanted portions 13,14 of the top edge of one of the side walls 12 and being conventionally attached along a longitudinal edge of the elongate board member 23 and along a side edge of the platform, and also includes a second wall 29 being conventionally mounted upon the top edge 19 of the end wall 18 and being conventionally attached along an end edge of the platform and being conventionally attached to the first wall 26. The first wall 26 includes an elongate main portion 27 which is conventionally mounted upon the slanted portion 14 of the top edge of one of the side walls 12, and also includes an end portion 28 which is angled relative to the elongate main portion 27 and which is conventionally mounted upon the horizontal portion 13 of the top edge of one of the side walls 12.

A light-emitting assembly for providing light along the ramp member 22 and the landing 25 for a pet to see while moving up and down the ramp member 22 includes light-emitting members 30 being spacedly and conventionally disposed in the first and second walls 26,29 and also includes wires 31 being conventionally connected to the light-emitting members 30, and further includes a power cord 32 being conventionally connected to the wires 31 and being adapted to be connected to an electrical outlet for the energizing of the light-emitting members 30.

In use, the user moves the pet-accessed lighted ramp assembly 10 against a piece of furniture such as a sofa or couch and plugs the power cord 32 into an electrical outlet to energize the light-emitting members 30. The user's pet can now easily, safely, and conveniently climb up onto the piece of furniture by simply walking up the ramp member 22, and to alight from the piece of furniture, the pet can wall back down the ramp member 22.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the pet-accessed lighted ramp assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet-accessed lighted ramp assembly comprising:
   a support base being movably disposed upon a ground;
   a ramp member being mounted upon said support base for a pet to gain access to a piece of furniture;
   a landing being mounted upon said support base and being connected to said ramp member;
   a railing assembly being mounted upon said support base; and
   a light-emitting assembly for providing light along said ramp member and said landing for a pet to see while moving up and down said ramp member.

2. The pet-accessed lighted ramp assembly as described in claim 1, wherein said support base includes side and end walls having top edges, and also includes a doorway being disposed through one of said side walls, and further includes a door being hingedly attached to one of said side wall and being closeable over said doorway.

3. The pet-accessed lighted ramp assembly as described in claim 2, wherein said top edges of said sides wall include horizontal portions being elevated above the ground, and also include slanted portions extending from said horizontal portions to the ground.

4. The pet-accessed lighted ramp assembly as described in claim 3, wherein said ramp member includes an elongate board member being securely mounted upon said slanted portions of said side walls, and also includes slats being disposed upon a topside of said elongate board member and extending along a width of said elongate board member and being laterally-spaced along a length of said elongate board member to facilitate traction for the pet moving up and down said ramp member.

5. The pet-accessed lighted ramp assembly as described in claim 4, wherein landing includes a platform being securely mounted upon said horizontal portions of said side walls and upon said top edge of said end wall and being connected to a top end of said elongate board member.

6. The pet-accessed lighted ramp assembly as described in claim 5, wherein said railing assembly includes a first wall being mounted upon said horizontal and slanted portions of said top edge of one of said side walls and being attached along a longitudinal edge of said elongate board member and along a side edge of said platform, and also includes a second wall being mounted upon said top edge of said end wall and being attached along an end edge of said platform and being attached to said first wall.

7. The pet-accessed lighted ramp assembly as described in claim 6, wherein first wall includes an elongate main portion which is mounted upon said slanted portion of said top edge of one of said side walls, and also includes an end portion which is angled relative to said elongate main portion and which is mounted upon said horizontal portion of said top edge of one of said side walls.

8. The pet-accessed lighted ramp assembly as described in claim 6, wherein light-emitting assembly includes light-emitting members being spacedly disposed in said first and second walls, and also includes wires being connected to said light-emitting members, and further includes a power cord being connected to said wires and being adapted to be connected to an electrical outlet for the energizing of said light-emitting members.

* * * * *